United States Patent

Narayanan et al.

Patent Number: 5,217,640
Date of Patent: Jun. 8, 1993

[54] METHOD OF ACTIVATING α-BUTYROLACTONE (BLO) WITH ETHYL 3-ETHOXYPROPIONATE (EEP) TO PROVIDE IMPROVED VARNISH AND PAINT REMOVER SOLVENTS

[75] Inventors: Kolazi S. Narayanan, Palisades Park; Frank Fusiak, Bayonne, both of N.J.

[73] Assignee: Verona Inc., Greenville, S.C.

[21] Appl. No.: 774,952

[22] Filed: Oct. 11, 1991

Related U.S. Application Data

[63] Continuation of Ser. No. 590,722, Oct. 1, 1990, Pat. No. 5,098,592.

[51] Int. Cl.$^5$ .......... C11D 7/50; C11D 3/44; C11D 3/28; C23D 17/00
[52] U.S. Cl. .......... 252/162; 252/153; 252/170; 252/171; 252/DIG. 8; 134/38; 134/39; 134/40
[58] Field of Search .......... 252/153, 162, 170, 171, 252/DIG. 8; 134/38, 39, 40

[56] References Cited

U.S. PATENT DOCUMENTS

| | | | |
|---|---|---|---|
| 4,120,810 | 10/1978 | Palmer | 252/162 |
| 4,780,235 | 10/1988 | Jackson | 252/DIG. 8 |
| 4,812,255 | 3/1989 | Suwala | 252/162 |
| 5,049,314 | 9/1991 | Short | 252/162 |

FOREIGN PATENT DOCUMENTS 8707628 12/1987 PCT Int'l Appl. .

Primary Examiner—Paul Lieberman
Assistant Examiner—William S. Parks
Attorney, Agent, or Firm—Walter Katz; Marilyn J. Maue; Joshua J. Ward

[57] ABSTRACT

A method is provided herein which is particularly effective for removing or stripping varnish and paint from surfaces such as wood or metal which comprises activating NMP and/or BLO with about 1-30% by weight of an activator compound which is ethyl 3-ethoxypropionate (EEP).

8 Claims, 2 Drawing Sheets

CONTOURS OF % PAINT REMOVED FROM 3"x 5" AREAS OF WHOLE PANELS COATED WITH 4 COATS OF CURED PAINT AND VARNISH AFTER 30 MINUTES CONTACT STRIPPING TIME WITH COMPOSITIONS OF NMP, BLO AND EEP.

CONTOURS OF % PAINT REMOVED FROM 3"x 5" AREAS OF WHOLE PANELS COATED WITH 4 COATS OF CURED PAINT AND VARNISH AFTER 30 MINUTES CONTACT STRIPPING TIME WITH COMPOSITIONS OF NMP, BLO AND EEP.

METHOD OF ACTIVATING α-BUTYROLACTONE (BLO) WITH ETHYL 3-ETHOXYPROPIONATE (EEP) TO PROVIDE IMPROVED VARNISH AND PAINT REMOVER SOLVENTS

This is a continuation of application Ser. No. 590,722, filed Oct. 1, 1990, now U.S. Pat. No. 5,098,592.

BACKGROUND OF THE INVENTION

1. Field of the Invention

This invention relates to paint and varnish remover compositions, and more particularly, to a method of activating NMP and/or BLO for more effective paint and varnish removing action, and to compositions thereof.

2. Description of the Prior Art

The term "varnish and paint remover" as applied herein refers to chemical compositions which can strip or facilitate stripping of coatings, such as, paint, varnish, lacquer, shellac, polyurethane finishes and enamels, used to protect substrates such as wood and metal and to beautify them.

Methylene chloride paint strippers are currently the industry standard for stripper performance. Methylene chloride strippers are effective for quickly softening most types of paints. The speed at which methylene chloride performs is believed to be due to its high solvent power coupled with high volatility as reflected by its extremely fast evaporation rate. This high volatility shortens the work life of methylene chloride paint strippers. Frequently, when methylene chloride paint strippers are used on thick accumulations of paint, more than one application is required since the work life is insufficient to permit penetration through the accumulation of paint.

Methylene chloride is a chlorinated solvent which is closely regulated for environment protection. Recently, it was discovered that methylene chloride can cause tumors in rats and mice. Since that discovery, the wide use of that solvent by industry and consumers has come under close scrutiny by federal regulatory agencies.

N-methyl-2-pyrrolidone (NMP) has been employed in place of methylene chloride as the active ingredient in paint stripper compositions. Nelson, in U.S. Pat. No. 4,759,510, for example, described a composition for this use having low volatility which included about 20% to 90% by weight of NMP and 30% to 70% by weight of an aromatic hydrocarbon solvent.

Mixtures of NMP and γ-butyrolactone (BLO) also have been used as liquid formulations for removing screen printing inks. Madsen, in U.S. Pat. NO. 4,836,950, for example, described such a liquid composition which included 1-25% by volume of NMP and/or BLO. Valasek, similarly, in U.S. Pat. No. 4,664,721, described a composition which included 30-85% by weight of NMP and 10-35% by weight of an oxygenated solvent selected from esters and ethers. BLO was mentioned as a suitable ether, although butoxyethanol and cyclohexanone were preferred. Caster, in U.S. Pat. No. 4,865,758 described a method of removing paint with a lower alkyl substituted 2-oxazolidinone. In comparative results reported therein, it was disclosed that ethyl 3-ethoxypropionate had no effect on paint removal. McCullins, in British 1,487,737, described a paint remover composition for aerosol type paints in the form of a gel which included methyl ethyl ketone, ethyl acetae, ethoxyethanol and 2-ethoxyethyl acetate. This mixture of solvents was considered effective for paint sprayed graffiti as a viscous, transparent gel containing particles of silica or alumina in suspension. Palmer, in U.S. Pat. No. 4,120,810, described paint remover compositions of NMP and/or BLO, and at least 35 mole % of blends of alkyl naphthalenes and alkyl benzenes.

These and other compositions, however, have not proven particularly effective for removing paint and varnish from wood and metal surfaces, without containing objectionable halogenated or aromatic compounds. Furthermore, they do not possess the attributes of being biodegradable, non-flammable, having a low vapor pressure and low toxicity.

Accordingly, it is the object of the present invention to satisfy the above criteria for an environmentally safe commercial product for removing paint and varnish from surfaces, and to perform such removal effectively with less material than other related products on the market today.

These and other objects and features of the invention will be made apparent from the following description of the invention.

IN THE DRAWINGS

SUMMARY OF THE INVENTION

Figure 1:
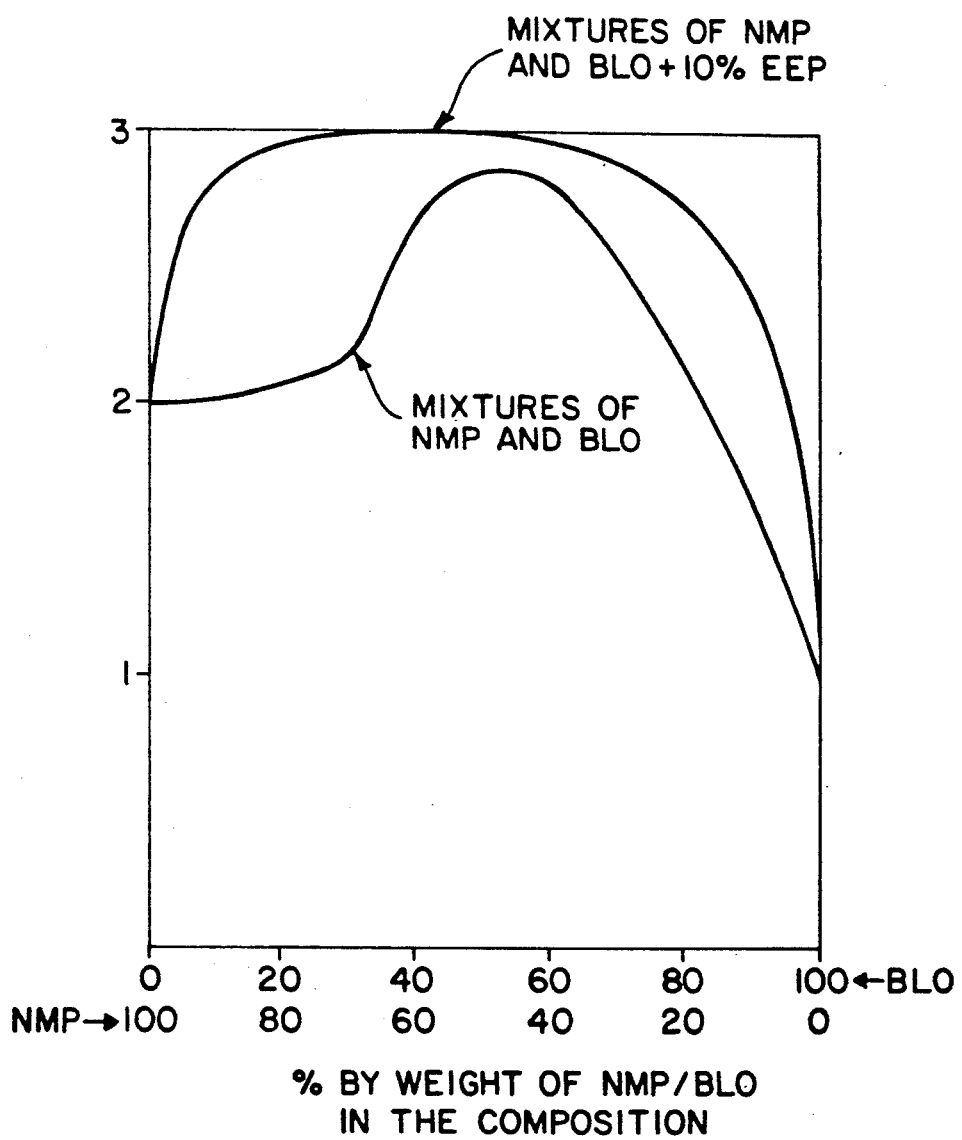
FIG. 1 is a graphical representation of effectiveness for removing layers of alkyd enamel paint from a wood surface of compositions containing various amounts of NMP and/or BLO, as activated with 10% EEP.

A method is provided herein which is particularly effective for removing or stripping varnish and paint from surfaces such as wood or metal which comprises activating NMP and/or BLO with 1-30% by weight of ethyl 3-ethoxypropionate (EEP), preferably 2-15%, and optimally about 3-5%.

In a suitable embodiment of the invention, the activated composition herein includes about 20-70% NMP, 30-80% BLO and 1-30% EEP, preferably 30-65% NMP, 35-70% BLO and 2-15% EEP, and optimally, 35-39% NMP, 55-59% BLO and 3-5% EEP.

The method of the invention provides activation for NMP and/or BLO an a synergistic effect for paint and varnish removal with less material than used previously with other related compositions, and in a safe and environmentally acceptable manner.

DETAILED DESCRIPTION OF THE INVENTION

Typical paint and varnish remover compositions of the present invention include the following components.

TABLE 1

| | COMPOSITION OF INVENTION | | | |
|---|---|---|---|---|
| | Suitable (% by Wt.) | Preferred | Most Preferred | Optimum |
| Essential Component | | | | |
| NMP | 20-70 | 30-65 | 35-39 | 36-37 |
| BLO | 30-80 | 35-70 | 55-59 | 56-57 |
| Activator Component | | | | |
| EEP Optional | 1-30 | 2-15 | 3-5 | 3.5 |

TABLE 1-continued
COMPOSITION OF INVENTION

| Components | Suitable (% by Wt.) | Preferred | Most Preferred | Optimum |
| --- | --- | --- | --- | --- |
| Surfactant | 0–5 | | | 2.5 |
| Thickener | 0–2 | | | 1.2 |
| Flavoring Agent | 0–0.5 | | | 0.25 |
| Bittering Agent | 0–0.04 | | | 0.0025 |
| Diluent | 0–40 | | | — |

As described in Table 1, the essential components of the paint and varnish remover composition of the invention include at least one compound selected from NMP and BLO, and mixtures thereof, which are activated by ethyl 3-ethoxypropionate (EEP). The activator compound EEP is available from Eastman Chemicals as Ektapro ® EEP solvent. The presence of EEP in the composition activates NMP and/or BLO so that more effective paint and varnish removal action is achieved. Since EEP reduces the flash point of the composition, which is not desirable, it is preferred to use the lower end of the suitable range of the activating effect of EEP.

The composition of the present invention may contain optionally, one or more of the group of a surfactant, a thickener, a fragrance, a bittering agent and a diluent.

Suitable surfactants include non-ionic surfactants with HLB ranging from about 8–18, selected from:

1. The polyethylene oxide condensates of alkylphenols, e.g., the condensation products of alkylphenols or dialkyl phenols wherein the alkyl group contains from about 6 to about 12 carbon atoms in either branched chain or particularly straight chain configuration, for example, octyl cresol, octyl phenol or nonyl phenol, with ethylene oxide, the said ethylene oxide being present in amounts equal to about 5 to about 25 moles of ethylene oxide per mole of alkylphenol.
2. Partial esters formed by the reaction of fatty acids, for example of about 8 to about 18 carbon atoms, with polhydric alcohols, for example, glycerol, glycols, such as, mono-, di-, tetra- and hexaethyleneglycol, sorbitan, etc.; and similar compounds formed by the direct addition of varying molar ratios of ethylene oxide to the hydroxy group of fatty acids.
3. The condensation products of fatty acid partial esters with ethylene oxide, such as, fatty acid esters of polyoxyethylene sorbitan and sorbitol containing from about 3 to about 80 oxyethylene units per molecule and containing fatty acid groups having from about 8 to about 18 carbon atoms.
4. The condensation products of aliphatic alcohols having from about 8 to about 18 carbon atoms in either straight chain or branched chain configuration, for example, oleyl or cetyl alcohol, with ethylene oxide, the said ethylene oxide being present in amounts equal to about 30 to about 60 moles of ethylene oxide per mole of alcohol.

Examples of surface active agents which may be used are those supplied under the following trade names:

| Name | Approximate Chemical Constitution |
| --- | --- |
| Antaron ® | monocarboxyl cocoimidazoline |
| Igepon ® | alkyl sulfoamides |
| Alipal ® | ammonium salt of ethoxylate sulfate |
| Igepal ® | ethoxylated alkylphenol |
| Emulphogene ® | tridecyloxypoly(ethyleneoxy)ethanol |
| Span 40 ® | sorbitan monopalmitate |
| Parasyn ® | hydrogenated castor oil |
| Miraniol ® | cocoamphodipropionate |
| Trydet ® | polyethoxylated fatty acid ester |

Thickeners may also be included in the inventive composition. The preferred thickeners or gelling agents are cellulose derivatives which have the property of both water and organic solvent solubility. Cellulose derivatives of this type which are of particular interest are those ether derivatives containing etherifying groups selected from hydroxyalkyl groups and groups derived therefrom, such etherifying groups containing preferably up to about 5 or 6 carbon atoms. The gelling agent may also comprise cellulose ether derivatives which, in addition to etherifying groups selected from hydroxyalkyl groups and groups derived therefrom, contain other types of etherifying groups, especially small alkyl groups of, for example, one or two carbon atoms. However, such etherifying groups generally confer properties upon the cellulose derivative which are less acceptable for the present purpose, and the gelling agent is therefore conveniently substantially restricted to cellulose ether derivatives containing etherifying groups selected from hydroxyalkyl groups and groups derived therefrom.

Etherifying groups consisting of or derived from hydroxyalkyl groups containing up to 5 carbon atoms, particularly, 2, 3 or 4 carbon atoms, are of especial value. The hydroxypropyl celluloses, for example, have been found to be of particular value in giving a substantially transparent gel system with a suitable solvent system and in imparting quite adequate thickening and film-forming properties in their own right without the need of any other agents for these purposes. Conveniently, the hydroxypropyl group in such celluloses is derived from isopropanol rather than n-propanol but a number of variations in structure are possible even when this is the case. Thus, not all of the free hydroxy groups of the cellulose need necessarily be substituted and, if desired, the hydroxy groups of certain hydroxypropyl groups may, in turn, be substituted by a further hydroxypropyl group (as for example, in the Klucel ® materials described below). Hydroxypropyl celluloses employed in compositions according to the present invention conveniently have molecular weights in the range from about 50,000 to about 1,000,000, preferably from about 800,000 to about 1,000,000.

One form of hydroxypropyl cellulose which has been used with advantage is marketed under the trade name Klucel H and is based upon repeating units containing a pair of anhydroglucose groups in which 5 of the free hydroxyl groups are etherified, the units being of the type:

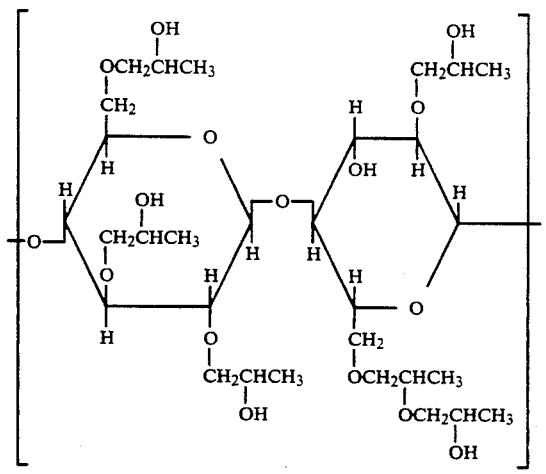

Klucel® H has a similar chemical structure to Klucel® MS 3.0, which may also be used, but is of higher molecular weight, and possesses particular advantages in terms of the viscosity of its solutions. Thus, a 1% solution of Klucel® H in water has a viscosity in the range from 1,500 to 2,500 units and in ethanol the range is 1,000 to 2,500 units while solutions of Klucel® MS 3.0, particularly in ethanol, have a lower viscosity. The property of possessing a substantially similar viscosity in organic solvent and aqueous solutions is a valuable one for gelling agents used in compositions according to the present invention. The proportion of gelling agent required in the compositions in order to give good gels, depends in part on the molecular weight of the gelling agent used, the usual range being from 0.25% to 2%. Thus, for example, with the usual proportion of gelling agent of from about 0.25% or 0.5% upwards is suitable for high molecular weight materials and of from about 2% upwards is suitable for low molecular weight materials. For high molecular weight materials, for example of molecular weights of 800,000 to 1,000,000, a proportion of above 1.5% is preferably avoided as it leads to a gel of too great a viscosity. With low molecular weight materials, larger proportions may be used before such a position is reached and, if the molecular weight is low enough, amounts of up to 10% or even 20% or more may be used. It will be appreciated, however, that the use of a smaller amount of material of higher molecular weight is generally to be preferred.

A typical fragrance is oil of wintergreen (methyl salicylate) although many others known in the art may be used as well.

Suitable diluents include organic hydrocarbons such as dipentene and xylene, alkylene glycol ethers such as propylene glycol monomethyl ether, tripropylene glycol monomethyl ether, dipropylene glycol monomethyl ether and tetrahydrofurfuryl alcohol, and propylene carbonate. Mixtures of these compounds also may be used.

A suitable bittering agent is denatonium benzoate although others known in the art may be used as well.

Representative compositions of the invention include the following Examples 1-6 below:

TABLE 2

| Component | % by Wt. Ex. No. | | | | | |
|---|---|---|---|---|---|---|
| | 1 | 2 | 3 | 4 | 5 | 6 |
| NMP | 27 | 27 | 37 | 38 | 47 | 27 |
| BLO | 41 | 41 | 57 | 56 | 47 | 41 |
| EEP | 2 | 2 | 3 | 3 | 3 | 3 |
| Igepal® RC-520 | 2 | 2 | 2 | 2 | 2 | 2 |
| Klucel® H | 1 | 1 | 1 | 1 | 1 | 1 |
| Methoxypropanol | 27 | — | — | — | — | — |
| Dipentene | — | — | — | — | — | 27 |
| Xylene | — | 27 | — | — | — | — |

A preferred composition of the invention is the following:

TABLE 3

| Example 7 Component | % by Wt. |
|---|---|
| NMP | 35-39 |
| BLO | 55-59 |
| Ethyl 3-ethoxypropionate | 3-4 |
| Emulphogene® DA-630 (polyoxyethylated (6) decyl alcohol) | 2-3 |
| Oil of Wintergreen | 0.2-0.3 |
| Denatonium benzoate | 0.002-0.003 |
| Klucel® H | 1.15-1.35 |

Referring now to FIG. 1, there is shown the relative effectiveness for removing 3 layers of alkyd enamel paint from wood of compositions containing NMP and/or BLO, which is activated with 10% EEP. What is evident in this graph is that EEP exerts an activation effect upon NMP alone, BLO alone and mixtures of NMP and BLO. Since mixtures of about 20-70% NMP, preferably 30-65%, and 30-80% BLO, preferably 35-70%, are more effective than the individual compounds for removing paint from wood panels, it is preferred that EEP be used to activate such mixtures. However, 10% EEP is seen to improve the remover performance of the NMP and/or BLO compounds to almost a 3 coat removal performance over the entire range of the individual compounds or mixtures thereof.

The results shown in FIG. 1 were obtained using one drop of test formulation applied to ½"×3"×24" panels of pine wood painted liberally with 3 coats of alkyd enamel paint and cured in air for 1 week and in an oven for 2 days at 50° C. The spots containing the reagents were scrapped of at 15 minutes and 30 minutes intervals and the relative paint stripping performance measured in terms of number of coats removed, 3 being perfect, by visual evaluation.

Figure 2:
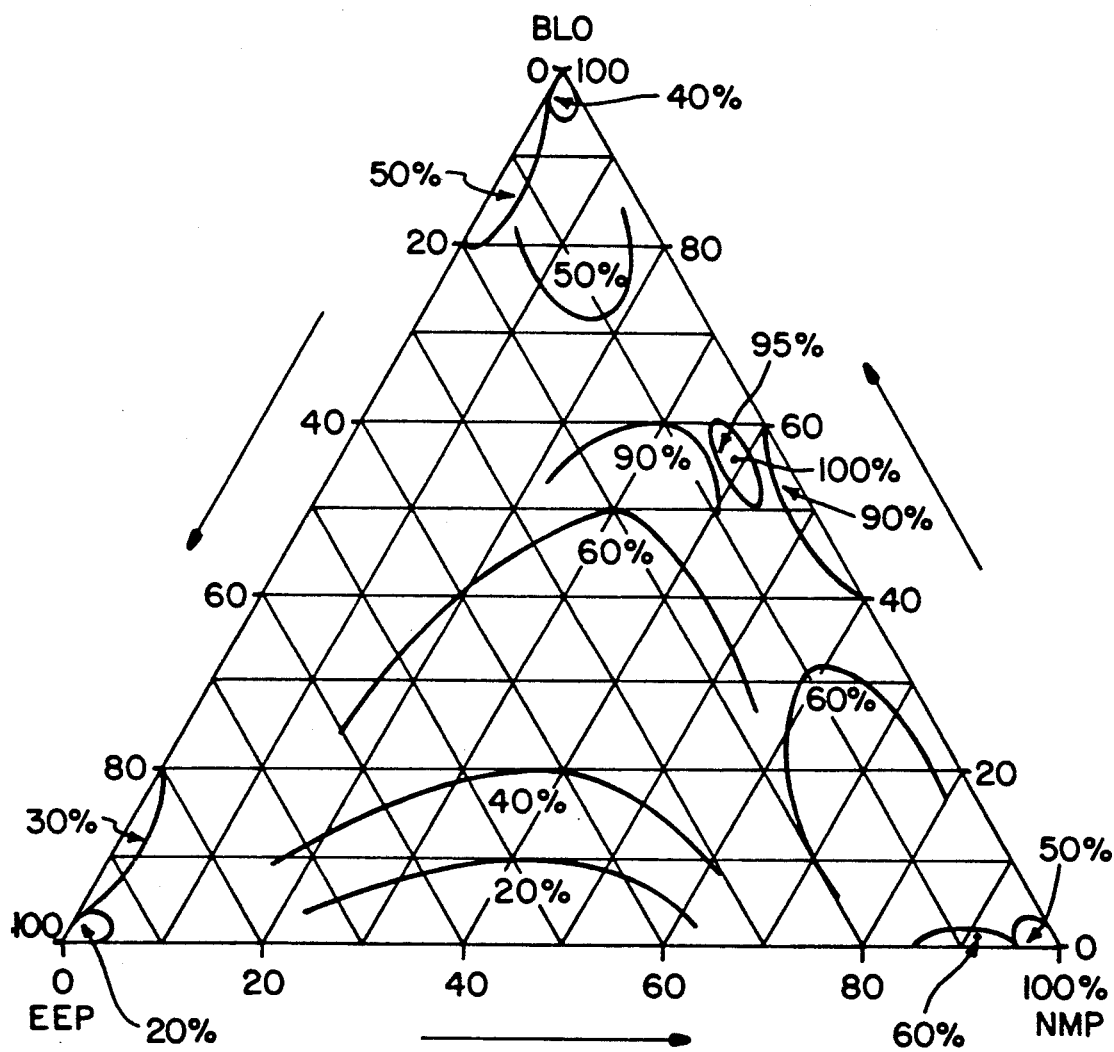
FIG. 2 is a 3-coordinate diagram of NMP, BLO and EEP to show the activation effectiveness of various amounts of EEP towards NMP, BLO and mixtures thereof.

FIG. 2 is a 3-coordinate diagram of NMP, BLO and EEP which shows the activation effectiveness of EEP at different levels towards NMP and/or BLO. The test results were obtained upon 12 whole panels of wood inter-painted with 4 coats of air cured paint and varnish materials for 8-24 hours. The effectiveness is measured as the percentage of the 4 coats removed after 30 minutes of stripping time with brush application of sufficient test material to cover the surface completely. The panels were coated with the following materials.

Panel 1: Glidden, acrylic latex—white,
Panel 2: Red Devil, acrylic enamel—brown,
Panel 3: Rickel Alkyd enamel—white,
Panel 4: Pittsburgh semigloss latex—white,
Panel 5: Glidden exterior gloss latex—black,
Panel 6: Rickel latex trim exterior gloss—green, Panel 7: Modern floor deck enamel interior-exterior—brown,
Panel 8: Muralo, acrylic midgloss—white,
Panel 9: Muralo, vinyl-acrylic latex—pink,
Panel 10: Mcloskey gloss polyurethane varnish clear,
Panel 11: Red Devil, gloss polyurethane-enamel—blue,
Panel 12: Sears, interior-exterior latex enamel high gloss—purple.

While the compositions herein have been shown are formulated as solutions, it will be understood that other forms of the inventive compositions may be used as well, such as aerosol sprays, gels, lotions, creams etc.

What is claimed is:

1. A method for removing paint or varnish from wood or metal surfaces which comprises providing a composition consisting essentially of about 70-99% by weight BLO and about 1-30% by weight of EEP, and applying the composition to the surface to be treated.

2. A method according to claim 1 wherein said amount of EEP is about 2-15%.

3. A method according to claim 1 wherein said amount of EEP is 3-5%.

4. A composition which is particularly effective for removing paint or varnish from wood or metal surfaces consisting essentially of about 70-99% by weight BLO and about 1-30% by weight EEP.

5. A composition according to claim 4 in which the amount of EEP is 2-15%.

6. A composition according to claim 4 in which the amount of EEP is 3-5%.

7. A composition according to claim 4 which includes one or more of the group of a surfactant, a thickener, a flavoring agent, a bittering agent and a diluent.

8. A composition according to claim 7 which includes, if present, up to about 5% by wt. of a surfactant, up to about 2% by wt. of a thickener, up to about 0.5% by wt. of a flavoring agent, up to about 0.04% by wt. of a bittering agent, and up to about 40% by wt. of a diluent.

* * * * *